A. JOHNSON.
COMBINED HOSE RACK AND VALVE.
APPLICATION FILED APR. 30, 1917.
1,252,699.
Patented Jan. 8, 1918.
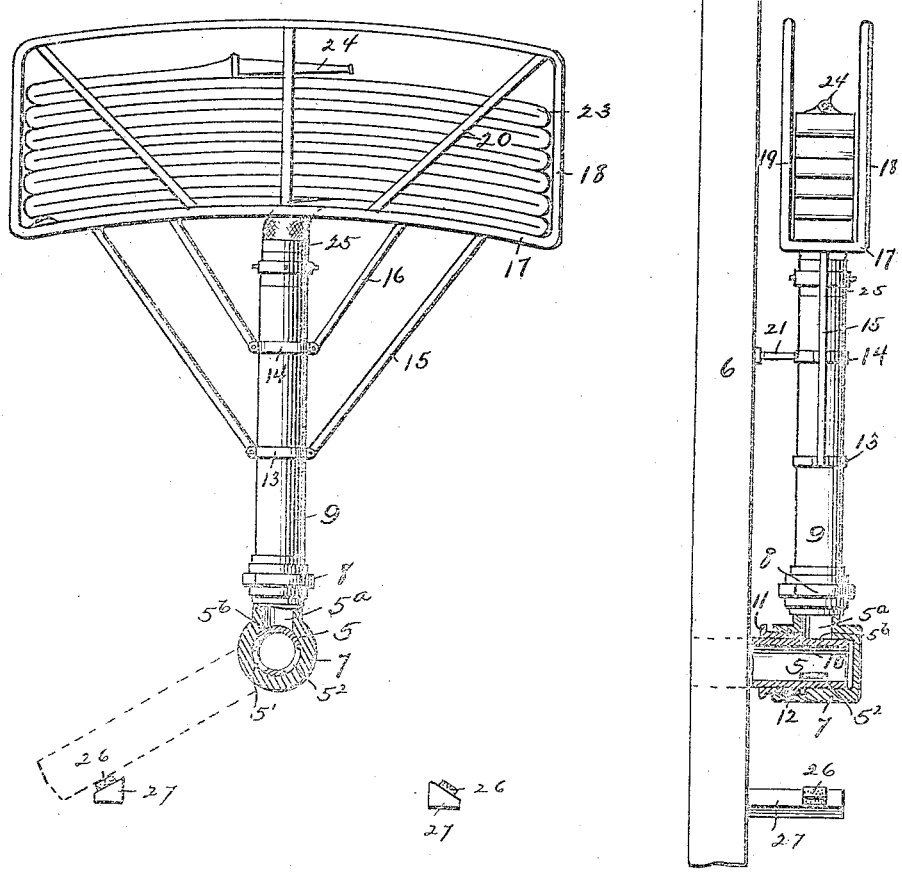
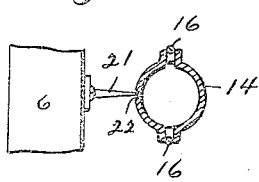
Inventor
Adolph Johnson
By Shepherd & Campbell
Attorneys

UNITED STATES PATENT OFFICE.

ADOLPH JOHNSON, OF CORONADO, CALIFORNIA.

COMBINED HOSE-RACK AND VALVE.

1,252,699.

Specification of Letters Patent.     Patented Jan. 8, 1918.

Application filed April 30, 1917.   Serial No. 165,500.

*To all whom it may concern:*

Be it known that I, ADOLPH JOHNSON, a citizen of the United States of America, residing at Coronado, in the county of San Diego and State of California, have invented certain new and useful Improvements in Combined Hose-Racks and Valves, of which the following is a specification.

This invention relates to a combined hose rack and valve in which the hose rack is mounted for bodily swinging movement and in which swinging movement of the hose rack either to the right or to the left precipitates the hose from the rack so that it may be rapidly drawn out and used and at the same time automatically turns on the water.

Further objects and advantages of the invention will be set forth in the detailed description which now follows.

In the accompanying drawing,

Figure 1 is a front elevation of the hose rack constructed in accordance with the invention with the valve in section.

Fig. 2 is an end elevation thereof with the valve in section, and

Fig. 3 is a detail, sectional view of a clamp hereinafter described illustrating a friction detent which acts in conjunction therewith.

Like numerals designate corresponding parts in all of the figures of the drawing.

In the drawing 5 designates a water supply pipe leading through a wall indicated at 6. The outer end of the pipe 5 is embraced by a sleeve 7, said sleeve being connected by a union 8 with a vertically disposed pipe 9. The pipe 5 carries a flange 10 and a packing nut 11 of the sleeve 7 compresses packing 12 between itself and the flange 10 to thereby provide a water-tight joint at this point and at the same time prevent endwise movement of the sleeve 7 with respect to the pipe 5 so that the sleeve 7 is held from being forced off of the pipe 5 by the pressure of the water. Suitable clamps 13 and 14 embrace the upstanding pipe 9 and are connected by braces 15 and 16 with a hose rack 17. This hose rack comprises the side members 18 and 19 and braces 20. A spring finger 21 projects from the wall 6 and engages a notch 22 formed in the clamp 14. This frictional engagement of this finger is sufficient to normally hold the rack in the full line position shown in Fig. 1. The fire hose is indicated at 23 and is provided with the usual nozzle 24. This hose is connected by a coupling 25 with the vertical pipe 9. It will be apparent that when the hose is pulled from the rack with sufficient force to disengage the spring tongue 21 from the notch 22 the rack may swing bodily to the right or to the left according to the direction in which the hose is pulled and in either case the water will be automatically turned on to the hose as follows: The pipe 5 is provided with two ports, $5'$, $5^2$ and the connection between the sleeve 7 and the pipe 9 constitutes a port $5^a$ that is adapted to register with either the port $5'$ or the port $5^2$ according to whether the hose rack is pulled to the right or to the left. The water is shut off when the pipe 9 stands in a vertical position due to the fact that at this time the port $5^a$ lies over the imperforate portion $5^b$ of the pipe 5. Bumpers 26 are carried by laterally extending members 27 which project from the wall 6 and limit the downward movement of the hose rack to a position where the hose will be connected with the pipe 9 without any sharp bend being formed in the same.

The swinging of the rack to valve opening position may be accomplished in either of two ways. The operator may grasp the hose nozzle and pull the hose from the rack to the limit of movement of the same. An additional pull of the hose will then rock the rack outwardly and downwardly.

Another way of accomplishing the same result is to twist the rack with the hose still in it and let the weight of the hose act to perform the opening of the valve. This latter method presents decided advantages because the joint between the vertical pipe 9 and the pipe 5 must of necessity be a tight one in order to prevent leakage of the water and the weight of the hose may be utilized as above set forth to aid in the opening movement of the valve.

Having described my invention what I claim is:—

The combination with a wall of a water supply pipe which lies substantially horizontal and at right angles to said wall, a vertical pipe section mounted for swinging movement upon the water supply pipe in a plane substantially parallel with the wall, a hose rack carried by and bodily movable with the pipe section and comprising sides which lie substantially parallel with the wall and open ends and a three way valve between the vertical pipe section and the water supply pipe constructed to shut off the water when the vertical pipe section is in normal position and to turn on the water when the rack and the pipe section by which it is carried, are swung downwardly in either direction.

In testimony whereof I affix my signature.

ADOLPH JOHNSON.

Copies of this patent may be obtained for five cents each, by addressing the "Commissioner of Patents, Washington, D. C."